UNITED STATES PATENT OFFICE.

RENÉ BOHN, OF MANNHEIM, GERMANY, ASSIGNOR TO THE BADISCHE ANILIN AND SODA FABRIK, OF LUDWIGSHAFEN, GERMANY.

GREEN DYE AND PROCESS OF MAKING SAME.

SPECIFICATION forming part of Letters Patent No. 646,796, dated April 3, 1900.

Application filed April 11, 1899. Serial No. 712,631. (Specimens.)

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of a Green Dye of the Naphthalene Series, (for which application for patent has been made in Germany, filed September 16, 1898, No. B. 23,419; in England, filed November 23, 1898, No. 24,752, and in France, filed November 28, 1898, No. 271,355,) of which the following is a specification.

In United States Patent No. 631,614, granted August 22, 1899, there is described the production of a leuco compound from the body known in chemical literature as the "naphthazarin" intermediate product. In United States Patent No. 627,896, granted June 27, 1899, the conversion of the said leuco compound into new blue coloring-matter having the nature of a sulfoacid is described.

My present invention relates to the manufacture of a green dye of the naphthalene series from the said blue sulfonated coloring-matter of said Patent No. 627,896. My new green dye is obtained by condensing the said coloring-matter with anilin or equivalent aromatic amin and sulfonating the insoluble coloring-matter which is at first obtained.

The following example will serve to illustrate the manner in which my invention is best carried into practical effect. Parts are by weight: Mix together about ten (10) parts of the aforesaid sulfonated coloring-matter of said Patent No. 627,896 and one hundred (100) parts of anilin and forty (40) parts of anilin hydrochlorate. Heat the mixture till it boils and maintain at this temperature for about an hour. The melt is at first of a beautiful blue color, but turns green. Pour the melt into about two thousand (2,000) parts of water, add about five hundred (500) parts of hydrochloric acid, (containing about thirty-two per cent. H.Cl.,) and filter the coloring-matter thus obtained. Press and dry.

This coloring-matter is insoluble in water and is converted into a soluble product by sulfonation in order to render it capable of use for dyeing. For this purpose mix about ten (10) parts thereof with about two hundred (200) parts of concentrated sulfuric acid containing about ninety-six per cent. $H_2SO_4$. Heat the mixture to a temperature of about 30° to 40° centigrade while stirring and continue stirring for about twenty-four hours. Pour the melt into about one thousand (1,000) parts of water and precipitate the coloring-matter with common salt.

The new coloring-matter thus obtained dyes unmordanted wool from the acid-bath, giving green shades. In appearance the product is a black powder which dissolves in water, giving a green solution. In glacial acetic acid it gives a blue-green solution. The solution in concentrated sulfuric acid is brown-red, and in aqueous caustic soda it is green.

My new coloring-matter can be obtained by heating the new coloring-matter with anilin alone to a high temperature instead of using the aromatic amin partly as free anilin and partly in the form of its hydrochloric acid salt, as described in the foregoing example.

Now what I claim is—

1. The process for the production of green coloring-matter of the naphthalene series which consists in heating a sulfonated leuco compound of the naphthazarin intermediate product with anilin and sulfonating the resulting product, substantially as described.

2. The process for the production of green coloring-matter of the naphthalene series which consists in heating a sulfonated leuco compound of the naphthazarin intermediate product with anilin and anilin hydrochlorid and subsequently sulfonating the resulting product, substantially as described.

3. As a new article of manufacture the green coloring-matter of the naphthalene series which can be obtained by treating sulfonated leuco compound of the naphthazarin intermediate product with aniline and subsequently sulfonating the resulting insoluble coloring-matter, and which new coloring-matter gives a green solution in water, a blue-green solution in glacial acetic acid, a brown-red solution with concentrated sulfuric acid and a green solution with aqueous caustic soda, all substantially as described.

In testimony whereof I have hereunto set my hand in the presence of two subscribing witnesses.

RENÉ BOHN.

Witnesses:
ERNEST F. EHRHARDT,
J. L. HEINKE.